(12) United States Patent
Lin

(10) Patent No.: US 9,731,467 B2
(45) Date of Patent: Aug. 15, 2017

(54) FOOD PROCESSOR

(71) Applicant: Tsun-Wei Lin, Tainan (TW)

(72) Inventor: Tsun-Wei Lin, Tainan (TW)

( * ) Notice: Subject to any disclaimer, the term of this patent is extended or adjusted under 35 U.S.C. 154(b) by 189 days.

(21) Appl. No.: 14/857,279

(22) Filed: Sep. 17, 2015

(65) Prior Publication Data

US 2017/0080661 A1 Mar. 23, 2017

(51) Int. Cl.
*B30B 9/12* (2006.01)
*A23N 1/02* (2006.01)
*B02C 18/30* (2006.01)
*A47J 19/02* (2006.01)

(52) U.S. Cl.
CPC ............ *B30B 9/121* (2013.01); *A23N 1/02* (2013.01); *A47J 19/02* (2013.01); *A47J 19/025* (2013.01); *B02C 18/301* (2013.01)

(58) Field of Classification Search
CPC .......... A47J 19/02; A47J 19/025; A47J 19/06; B30B 9/12; B30B 9/121; B30B 11/24; B02C 18/301; A23N 1/02
USPC .................. 100/117, 145; 99/495, 510, 513; 241/101.2, 260.1
See application file for complete search history.

(56) References Cited

U.S. PATENT DOCUMENTS

| | | | | |
|---|---|---|---|---|
| 2,210,006 A | * | 8/1940 | Rieske | B02C 18/302 100/98 R |
| 5,156,872 A | * | 10/1992 | Lee | A23N 1/00 100/117 |
| 5,906,154 A | * | 5/1999 | Yoon | A23N 1/00 100/117 |
| 6,655,615 B1 | * | 12/2003 | Hartmann | A23N 1/02 241/71 |

* cited by examiner

*Primary Examiner* — Jimmy T Nguyen
(74) *Attorney, Agent, or Firm* — Muncy, Geissler, Olds & Lowe, P.C.

(57) ABSTRACT

A food processor includes a tubular member, and a spindle inserted into the tubular member and including a guide entry section, a crushing section, a grinding section, an extension section, a guide exit section, a guide thread helically wound around the guide entry section, a crushing thread helically wound around the crushing section, and a plurality of spaced-apart grinding threads helically extending from the grinding section to the guide exit section. The guide thread has first and second ring segments each helically extending one revolution around the guide entry section. The first ring segment has a thread depth smaller than that of the second ring segment.

9 Claims, 9 Drawing Sheets

FOOD PROCESSOR

FIELD

The disclosure relates to a food processor, more particularly to a food processor for use in extracting juice from fruits and vegetables, crushing ice, grinding cereal grains, extruding noodles, mincing meat, etc.

BACKGROUND

Referring to FIGS. 1 and 2, a grinding and extracting device of an existing food processor includes a tubular member 1 and a spindle 2. The tubular member 1 surrounds a central axis 10, and includes a tubular main body 11 that tapers from a rear side to a front side thereof, a plurality of angularly spaced-apart protruding ribs 12 protruding from an inner wall surface of the tubular main body 11 and extending along the central axis 10, a metal ring 13 embedded in the inner wall surface of the tubular main body 11 and located at a front end of the protruding ribs 12, a support screen plate 14 projecting rearwardly from a rear bottom edge of the tubular main body 11, an annular flange 15 spaced apart from the front side of the tubular main body 11, a filter member 16 located at a front side of the metal ring 13 and connected between the annular flange 15 and the tubular main body 11, and an elastic ring 17 disposed inside and protruding radially and inwardly from the annular flange 15.

The spindle 2 is inserted into the tubular member 1 and is driven by a drive unit (not shown) to rotate about the central axis 10. The spindle 2 includes a guide entry section 211 disposed above the support screen plate 14, a crushing section 212 extending forwardly and gradually enlarging from the guide entry section 211 to a position proximate to the metal ring 13, a grinding section 213 tapering forwardly from the crushing section 212, a filter section 214 extending forwardly from the grinding section 213 into the filter member 16, and a guide exit section 215 extending forwardly from the filter section 214 and passing through the elastic ring 17. The spindle 2 further includes a guide thread 22 helically wound around the guide entry section 211, a crushing thread 23 helically wound around the crushing section 212, eight spaced-apart grinding threads 24 helically wound around the grinding section 213, and four spaced-apart filter threads 25 helically wound around the filter section 214.

In operation, the spindle 2 is driven to rotate relative to the tubular member 1, and foodstuff is placed at the rear side of the tubular main body 11. The foodstuff is cut into sections by the guide thread 22, and is guided by the same to move forward into the tubular main body 11. The sectioned foodstuff is then crushed through cooperation of the crushing thread 23 and the ribs 12, after which it is ground through cooperation of the grinding threads 24 and the metal ring 13. As the ground foodstuff is guided by the filter threads 25 to pass through the filter member 16, the foodstuff is squeezed to extract juice therefrom, and the extracted juice drips out of the filter member 16 to be collected on a jug or drinking glass. Foodstuff residues are moved forwardly to push outward the elastic ring 17 and to move out of the tubular main body 11 for discharge after passing through a gap between the guide exit section 215 and the annular flange 15.

However, the design of the grinding and extracting device of the existing food processor has the following drawbacks that need to be improved:

First, since a thread depth of the guide thread 22 that protrudes radially from the guide entry section 211 is uniform and a gap between the guide thread 22 and the support screen plate 14 is relatively narrow, when cutting and guiding the foodstuff, the foodstuff is likely to get stuck in the gap, so that the spindle 2 receives a large rotational resistance and cannot rotate smoothly. As such, the load of the drive unit is relatively increased. Hence, the drive unit is easy to break down.

Second, because gaps between the filter threads 25 and the filter member 16 are large and because a screw lead of the filter threads 25 is equal to four times the pitch, the distance between each filter thread 25 is large, so that the processed foodstuff and the residues cannot be uniformly distributed among the filter threads 25. That is, some of the gaps are squeezed with more residues, while others are squeezed with less residues or are free from residues. As a result, the spindle 2 cannot be steadily held in the tubular member 1, but shakes and produces noise during rotation.

Third, the diameter of the spindle 2 changes abruptly from a rear side to a front side thereof, and only the protruding portion between the crushing section 212 and the grinding section 213 is adjacent to the metal ring 13, so that the main grinding process of the foodstuff is concentrated and accomplished in said portion. In this manner, the metal ring 13 bears the largest squeezing force, and the foodstuff is easily accumulated between the grinding section 213 and the metal ring 13. Not only is the rotation of the spindle 2 difficult, but also the foodstuff cannot be uniformly ground. As a result, the efficiency of juice extraction is low. In addition, because an annular gap 18 is formed between the metal ring 13 and the filter member 16 such that the foodstuff and the residues are easily stuck in the gap 18, a portion of the tubular main body 11 that corresponds to the gap 18 bears a strong squeezing force, causing the portion of the tubular main body 11 to crack and damage. Thus, the service life of the tubular member 1 is shortened.

Fourth, because the elastic ring 17 is fixedly connected to the inside of the annular flange 15, when the elastic ring is damaged or deteriorated, the whole tubular member 1 must be removed and replaced with a new one.

SUMMARY

Therefore, the object of the disclosure is to provide a food processor that is capable of alleviating at least one of the drawbacks of the prior art.

Accordingly, a food processor of the present disclosure includes a tubular member and a spindle. The tubular member surrounds an axis and includes a tubular main body having a first tubular wall located on a rear side thereof and a second tubular wall extending forwardly from the first tubular wall, a neck portion connected to a front end of the second tubular wall, and an annular flange protruding outwardly and radially from a front end of the neck portion. The tubular main body further has a plurality of angularly spaced-apart protruding ribs extending from an inner wall surface of the first tubular wall to an inner wall surface of the second tubular wall. The second tubular wall has a frustoconical shape and tapers from a rear side to a front side of the second tubular wall. The spindle is mounted to the tubular member and is rotatable about the axis. The spindle includes a guide entry section disposed rearwardly of the first tubular wall, a crushing section extending forwardly from the guide entry section into the first tubular wall, a grinding section extending forwardly from the crushing section into the second tubular wall, an extension section extending forwardly from the grinding section into the neck portion, a guide exit section extending forwardly from the extension section into the annular flange, a guide thread helically wound around the guide entry section, a crushing thread connected to the guide thread and helically wound around the crushing section, and a plurality of spaced-apart grinding threads helically extending from the grinding section to the guide exit section. The guide thread has a first ring segment helically extending one revolution around the guide entry section, and a second ring segment connected to one end of the first ring segment and helically extending one revolution around the guide entry section. The first ring segment has a thread depth smaller than that of the second ring segment.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
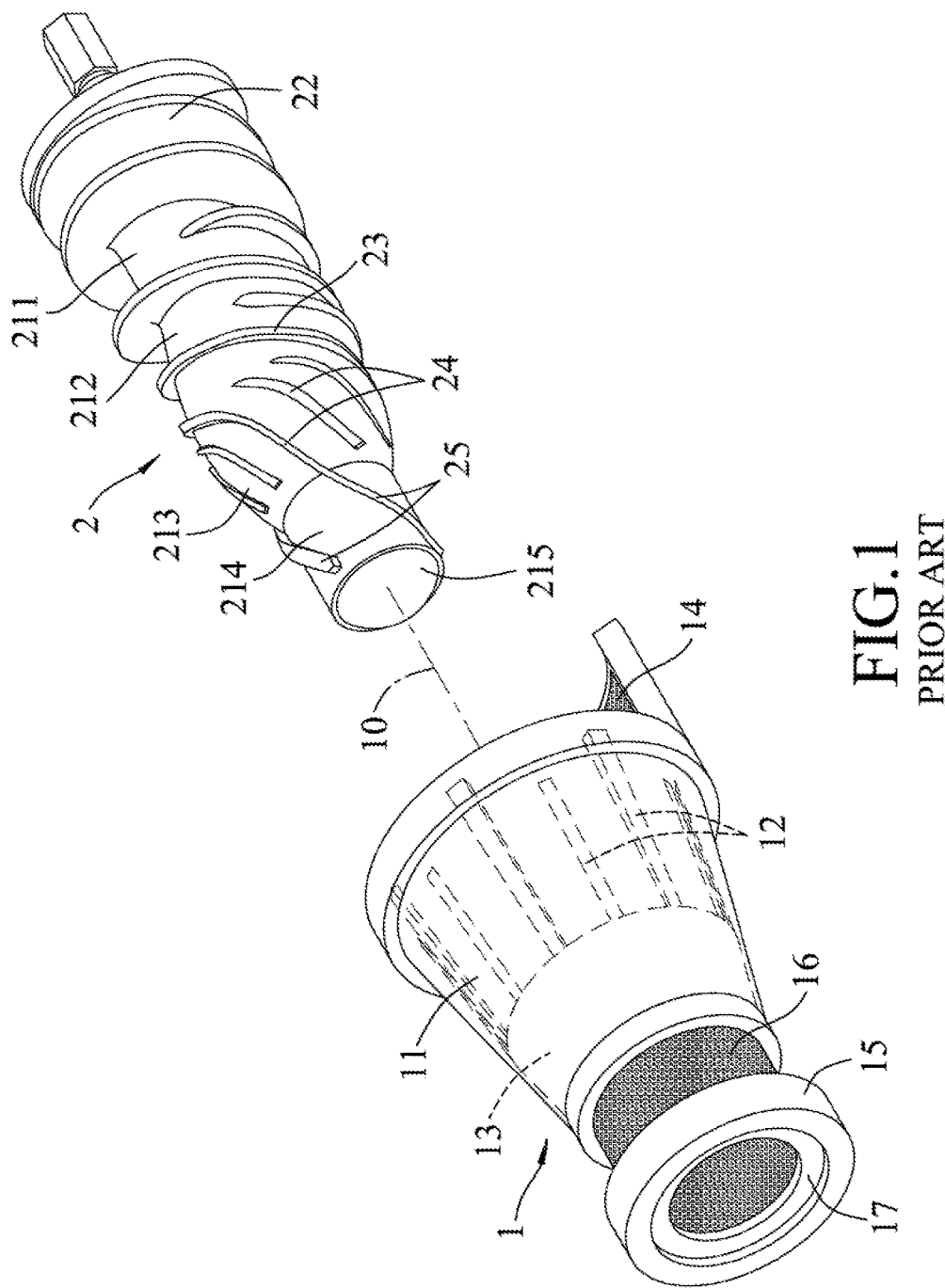
FIG. 1 is an exploded perspective view of a grinding and extracting device of an existing food processor.
Figure 2:
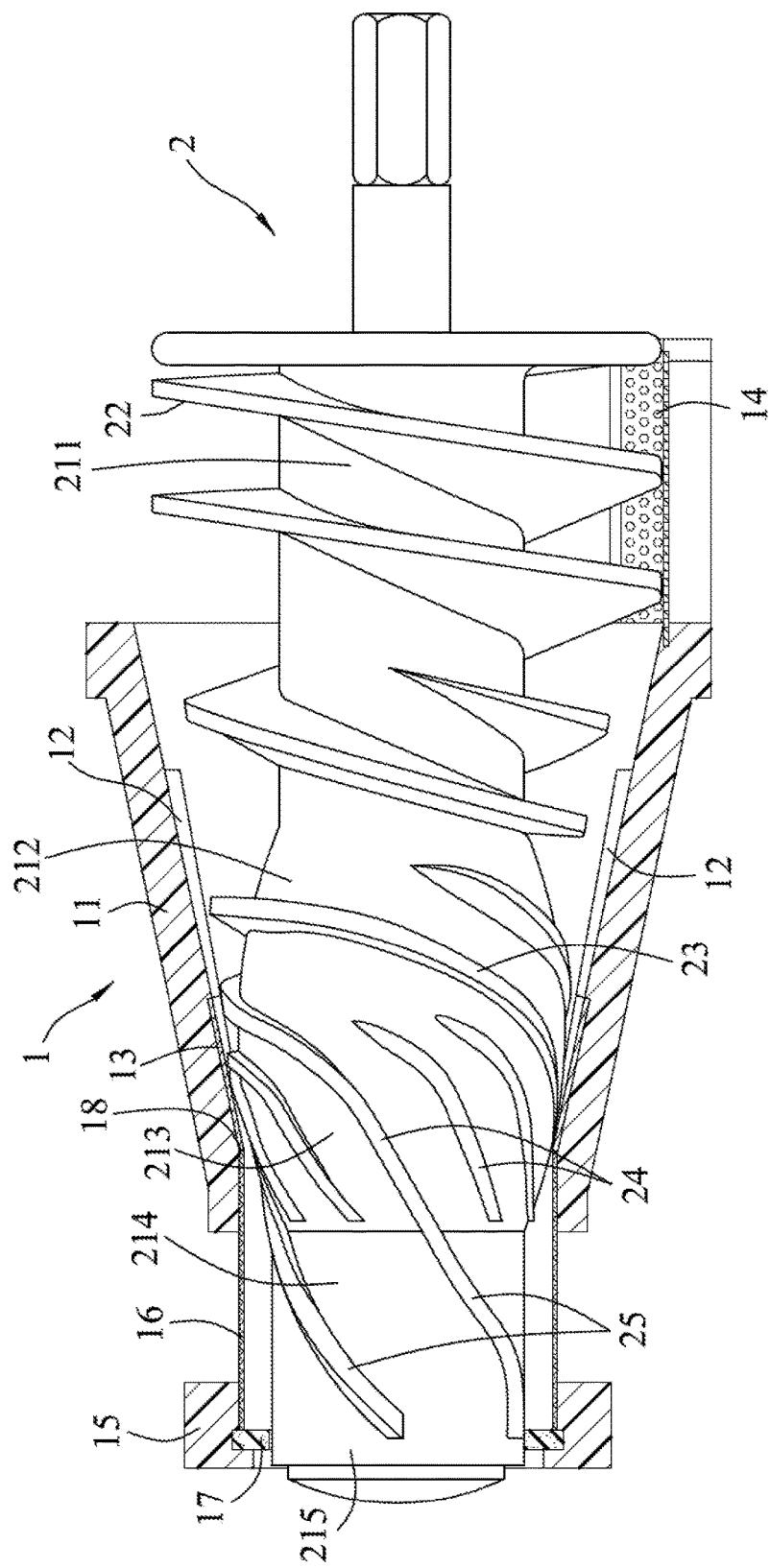
FIG. 2 is a partial cross-sectional side view of FIG. 1 in an assembled state.

Before the present disclosure is described in greater detail, it should be noted that like elements are denoted by the same reference numerals throughout the disclosure.

Figure 3:
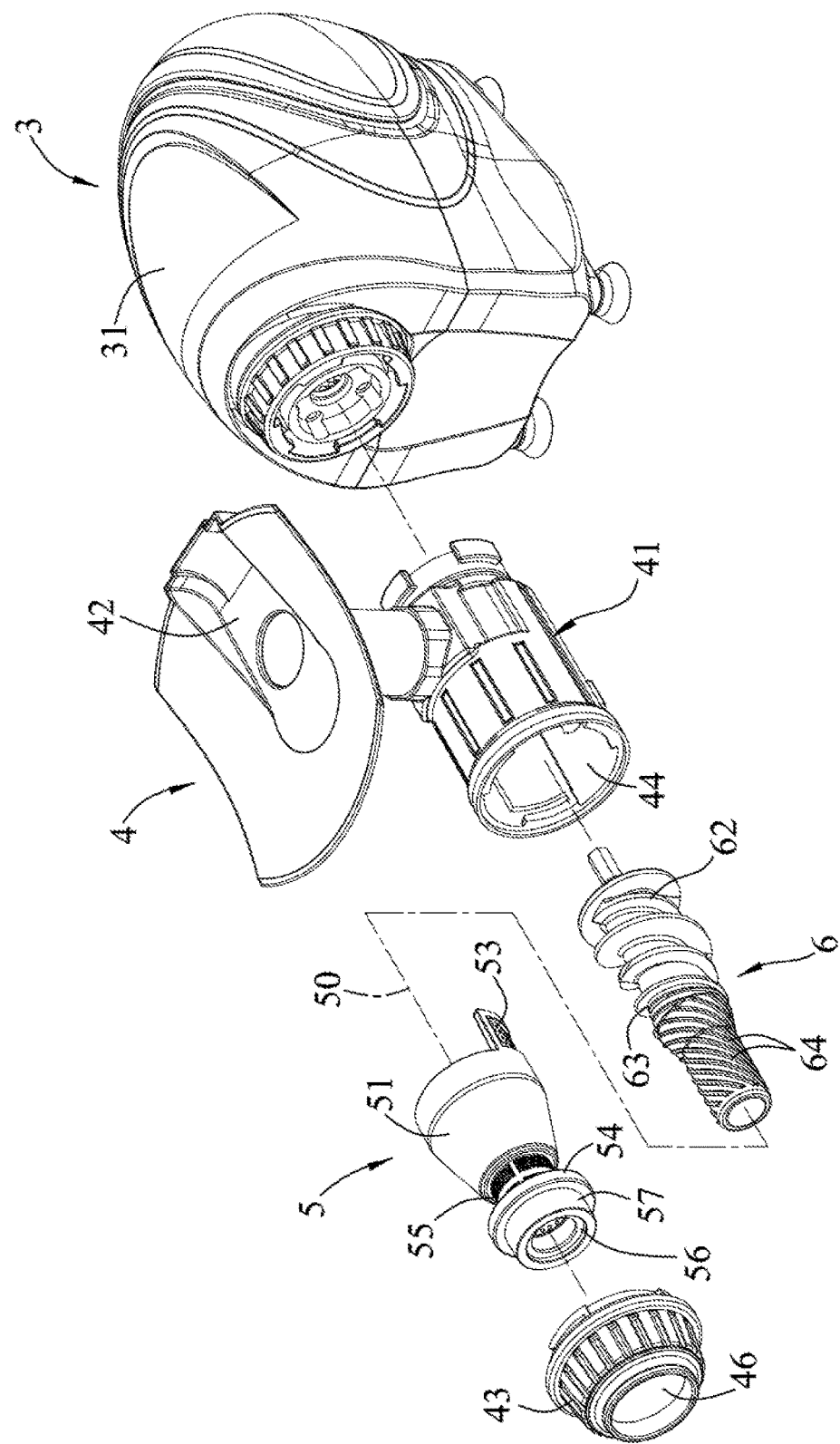
FIG. 3 is an exploded perspective view of the first embodiment of a food processor according to the disclosure.
Figure 4:
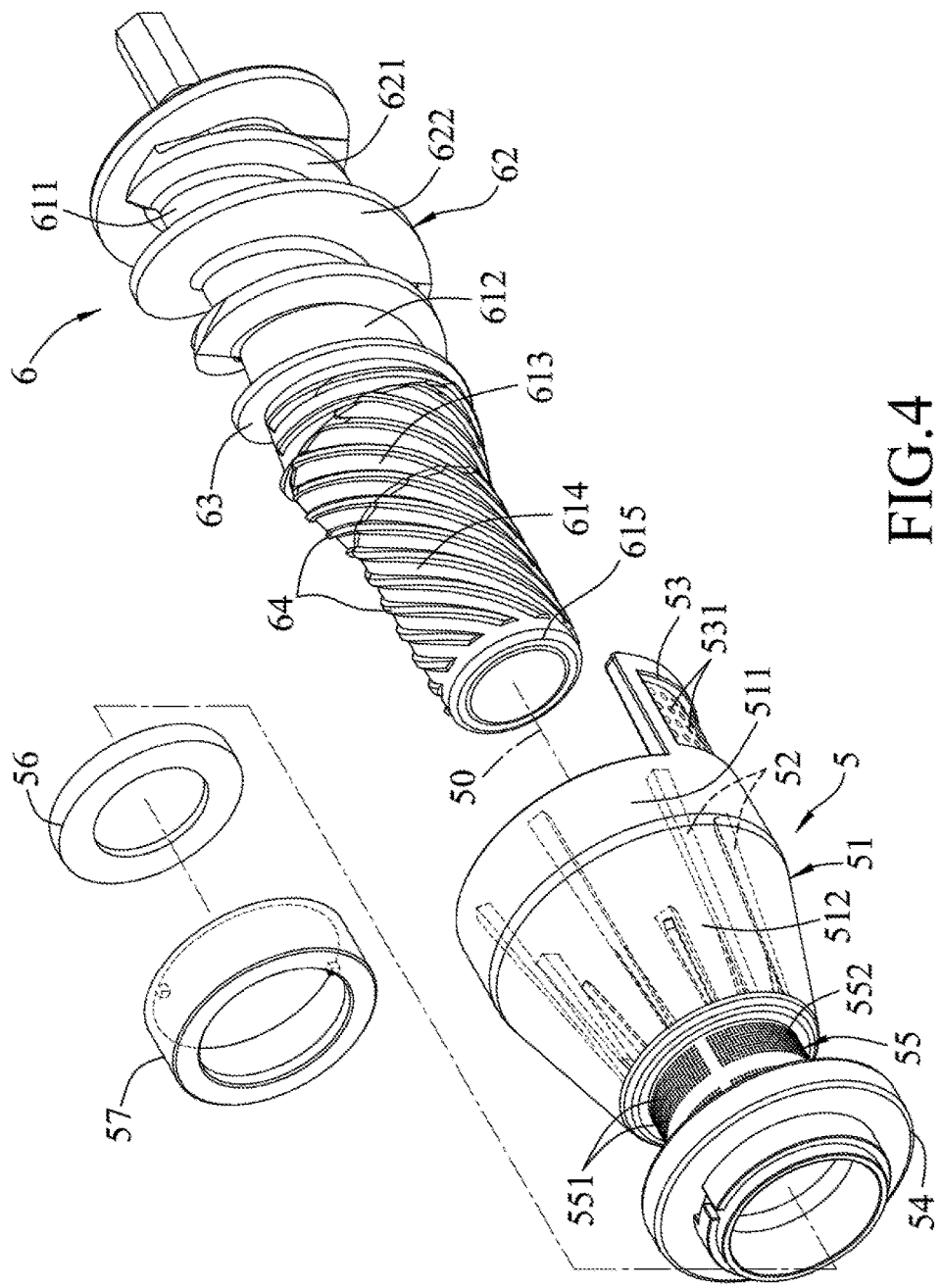
FIG. 4 is an exploded perspective view of a tubular member and a spindle of the first embodiment.
Figure 5:
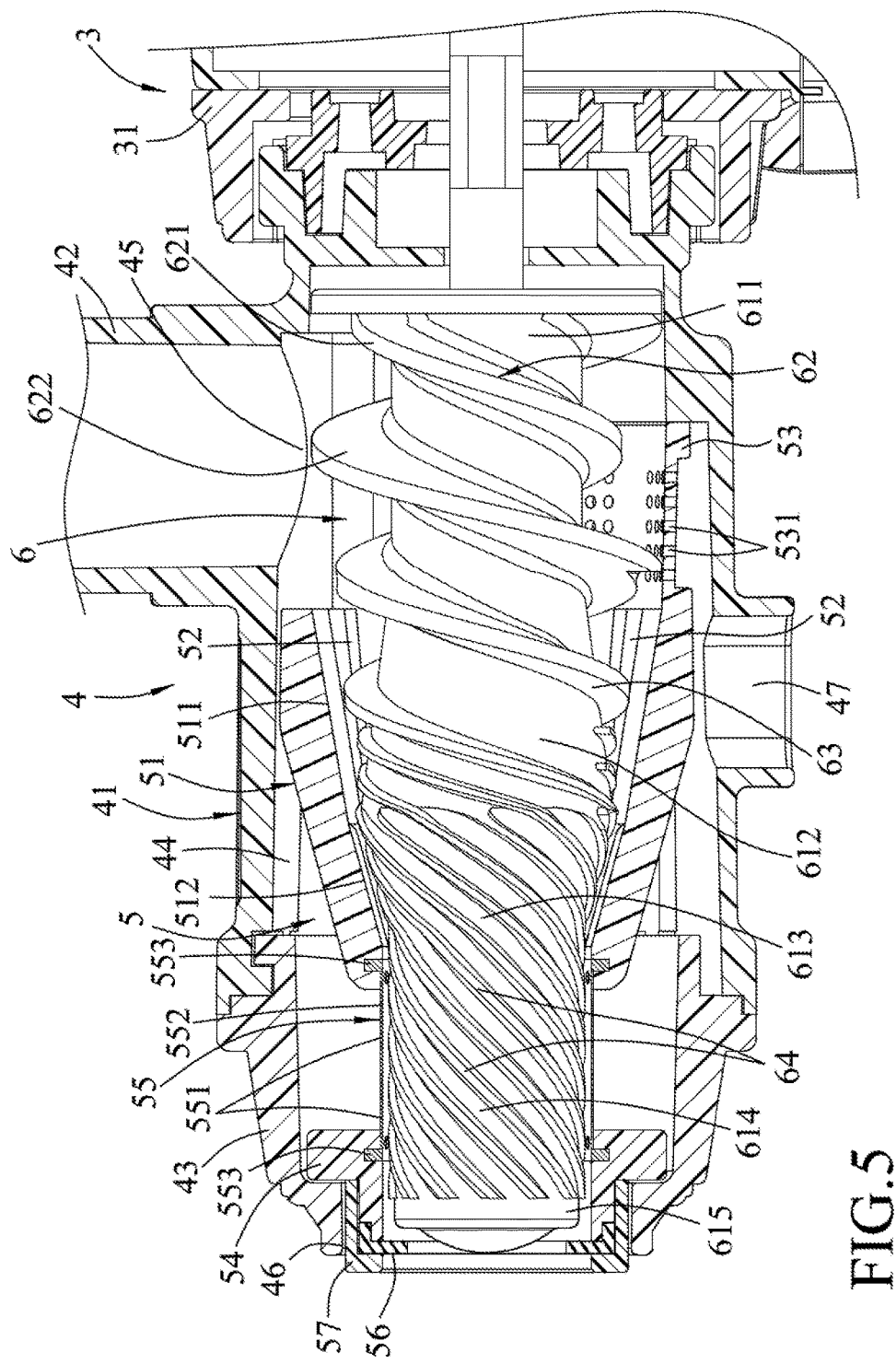
FIG. 5 is an enlarged fragmentary cross-sectional side view of the first embodiment in an assembled state.

Referring to FIGS. 3, 4 and 5, a food processor according to the first embodiment of the present disclosure is configured as a juicer for mincing and extracting juice from foodstuff (not shown), such as vegetables, fruits, high-fiber plants like wheatgrass, etc. The first embodiment includes a drive unit 3, a container unit 4, a tubular member 5 and a spindle 6.

The drive unit 3 is electrically connected to a mains supply, and includes a housing 31, and a motor (not shown) installed inside the housing 31 for providing rotary power. Since the structure and actuation of the drive unit 3 are not important aspect of the disclosure, a detailed description thereof is dispensed herewith.

The container unit 4 includes a hollow container body 41 detachably connected to a front side of the housing 31 of the drive unit 3, a feed tube 42 extending upwardly from a top portion of the container body 41 for guiding entrance of foodstuff to be processed into the container body 41, and a front cover 43 detachably connected to a front end of the container body 41. The container body 41 and the front cover 43 cooperatively define a receiving space 44. The container body 41 has a guide inlet opening 45 that is formed in the top portion thereof and that communicates with the feed tube 42 and the receiving space 44, and a juice discharge opening 47 formed in a bottom portion thereof and communicating with the receiving space 44 for discharging squeezed juice from the foodstuff. The front cover 43 has a residue discharge opening 46 communicating with the receiving space 44 for discharging residues of the processed foodstuff.

The tubular member 5 surrounds an axis 50, is received in the receiving space 44, and includes a tubular main body 51 having a cylindrical first tubular wall 511 located on a rear side thereof and a second tubular wall 512 extending forwardly from the first tubular wall, a support plate 53 projecting rearwardly from a rear bottom edge of the tubular main body 51, a neck portion 55 connected to a front end of the second tubular wall 512, an annular flange 54 protruding outwardly and radially from a front end of the neck portion 55 and proximate to the residue discharge opening 46, an elastic ring 56 disposed at a front end of the annular flange 54, and a front frame ring 57 removably retaining the elastic ring 56 at the front end of the annular flange 54. The tubular main body 51 further has a plurality of angularly spaced-apart protruding ribs 52 extending from an inner wall surface of the first tubular wall 511 to an inner wall surface of the second tubular wall 512. The second tubular wall 512 has a frusto-conical shape and tapers from a rear side to a front side thereof.

The support plate 53 is located between the guide inlet opening 45 and the juice discharge opening 47. In this embodiment, the support plate 53 has a plurality of leaking holes 531 that are spaced apart from each other and that communicate with the receiving space 44, the guide inlet opening 45 and the juice discharge opening 47. The neck portion 55 has a filter member 552 that is cylindrical and that has a plurality of filter holes 551, and two annular protrusions 553 projecting outwardly, radially and respectively from front and rear ends of the filter member 552 and respectively embedded in the annular flange 54 and the front end of the second tubular wall 512. The elastic ring 56 and the front frame ring 57 are disposed in an inner periphery of the residue discharge opening 46.

The spindle 6 is inserted into the tubular member 5, and is driven by the motor of the drive unit 3 to rotate about the central axis 50. The spindle 6 includes a guide entry section 611 disposed rearwardly of the first tubular wall 511 and having a uniform diameter, a crushing section 612 extending forwardly and axially from the guide entry section 611 into the first tubular wall 511 and having a diameter gradually expanding from the guide entry section 611 toward a front side thereof, a grinding section 613 extending forwardly and axially from the crushing section into the second tubular wall 512 and having a diameter tapering from the crushing section 612 toward a front side thereof, an extension section 614 extending forwardly and axially from the grinding section 613 into the neck portion 55 and having a uniform diameter, and a guide exit section 615 extending forwardly from the extension section 614 into the annular flange 54 and having a uniform diameter. The guide entry section 611 is located between the guide inlet opening 45 and the support plate 53. The crushing section 612 and the first tubular wall 511 are spaced apart to form a first gap which tapers in a rear to front direction. The grinding section 613 and the second tubular wall 512 are spaced apart to form a uniform second gap which is smaller than the first gap. The extension section 614 and the neck portion 55 are spaced apart to form a uniform third gap which is equal to the second gap. A gap between the front end of the annular flange 54 and a front end of the guide exit section 615 is covered by the elastic ring 56.

Figure 6:
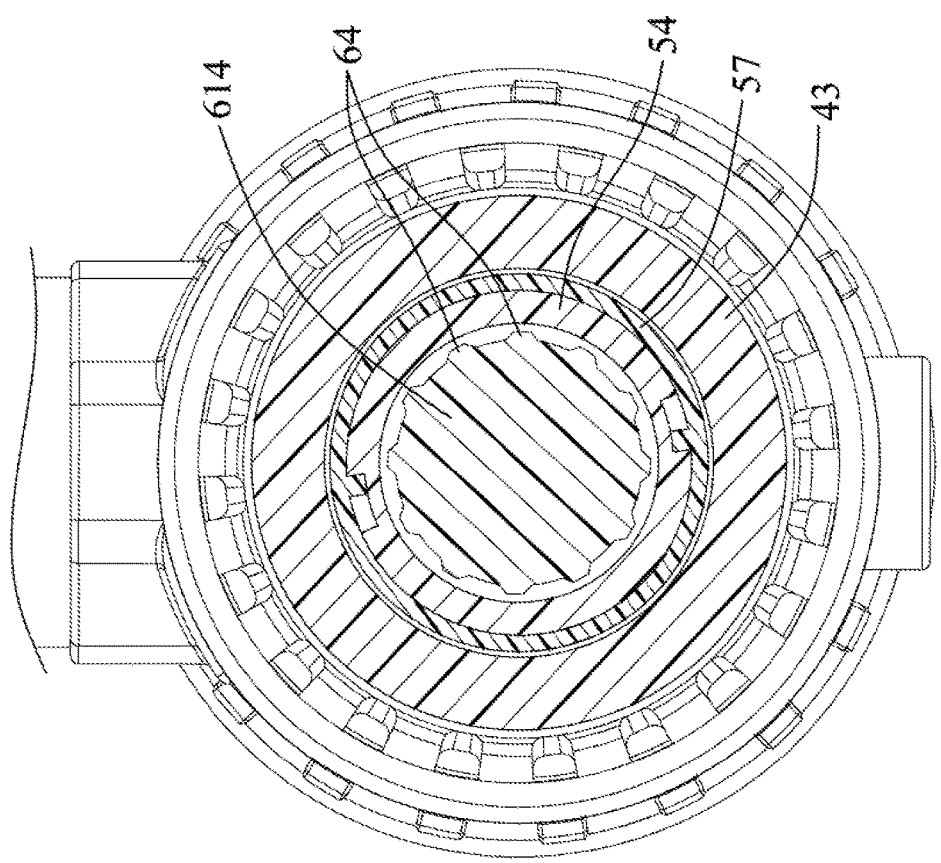
FIG. 6 is an enlarged fragmentary cross-sectional front view of the first embodiment.

The spindle 6 further includes a guide thread 62 helically wound around the guide entry section 611, a crushing thread 63 connected to the guide thread 62 and helically wound around the crushing section 612, and a plurality of spaced-apart grinding threads 64 helically extending from the grinding section 613 to the guide exit section 615. The guide thread 62 has a first ring segment 621 helically extending one revolution around the guide entry section 611, and a second ring segment 622 connected to one end of the first ring segment 621 and helically extending one revolution around the guide entry section 611. The second ring segment 622 has a thread depth larger than that of each of the first ring segment 621 and the crushing thread 63, and the thread depth from the first ring segment 621 to the second ring segment 622 gradually increases. Alternatively, the number of the first and second ring segments 621, 622 may be increased depending on the requirement. A pitch of the grinding threads 64 is equal to one to three times a thread depth thereof, and a screw lead of the grinding threads 64 is equal to eight to fourteen times the pitch. As shown in FIG. 6, in the first embodiment, the pitch of the grinding threads 64 is equal to double the thread depth thereof and the screw lead thereof is equal to twelve times the pitch.

In operation, the drive unit 3 is actuated to drive the rotation of the spindle 6, and the foodstuff is fed into the feed tube 42. The foodstuff falls into the guide entry section 611 of the spindle 6 via the guide inlet opening 45, and is cut into sections by the continuous rotation of the guide thread 62.

After the foodstuff is roughly cut by the guide thread 62, it is moved into the first tubular wall 511 by the crushing thread 63. The foodstuff passes through the tapering first gap which is between the crushing section 612 and the first tubular wall 511, and through a staggered cutting configuration of the crushing thread 63 and the ribs 52, the foodstuff is gradually minced. Next, the foodstuff is moved into the second gap, which is between the grinding section 613 and the second tubular wall 512, by the grinding threads 64 so as to be ground by the grinding threads 64 and the ribs 52. Afterwards, the ground foodstuff is continuously moved by the grinding threads 64 to the third gap, which is between the extension section 614 and the neck portion 55, for squeezing juice from the ground foodstuff. In the final step (or Finally), the residues of the squeezed foodstuff is continually moved forward to pass through a gap between the guide exit section 615 and the annular flange 54, and to push the elastic ring 56 so as to be discharged via the residue discharge opening 46.

It should be noted that, as the residues of the foodstuff are discharged via the residue discharge opening 46, the elastic ring 56 can block the scattered residues with moderate elastic force and prevent spilling of the juice, so that the extracted juice from the foodstuff can flow through the filter holes 551 of the filter member 552 and downward toward the juice discharge opening 47. Besides, during the aforesaid cutting, mincing and grinding processes, the juice above the support plate 53 will drip directly to the support plate 53, and the juice inside the tubular main body 51 will flow down along a slope to the support plate 53. Through the leaking holes 531, the juice in the support plate 53 will flow down to the juice discharge opening 47. The discharged juice from the juice discharge opening 47 can be drunk or used.

To sum up, the food processor according to the disclosure has the following advantages:

First, because the guide thread 62 is designed as having the first and second ring segments 621, 622, and a gap formed between the first ring segment 621 and the support plate 53 is larger than a gap formed between the second ring segment 622 and the support plate 53, a bigger space is formed between the first ring segment 621 and the support plate 53 for receiving a large amount of foodstuff, so that the foodstuff can be roughly cut into sections and can be smoothly moved forward. Hence, it is not easy for the foodstuff to get stuck between the guide thread 62 and the support plate 53 nor accumulated in the feed tube 42. Correspondingly, the spindle 6 can rotate smoothly, and the load of the motor of the drive unit 3 can be reduced to avoid overheat, so that power consumption and cost thereof can be minimized, and the breakdown of the motor can also be prevented.

Second, the grinding threads 64 helically extend from the grinding section 613 to the guide exit section 615, and the second gap between the grinding section 613 and the second tubular wall 512, the third gap between the neck portion 55 and the extension section 614, and the gap between the annular flange 54 and the guide exit section 615 are equal and are smaller than the first gap between the crushing section 612 and the first tubular wall 511. In addition, the screw lead of the grinding threads 64 is equal to twelve times the pitch. Through the aforesaid structures, the ground foodstuff and the residues thereof can be evenly distributed among the grinding threads 64, and can steadily hold the spindle 6 so that the spindle 6 can stably rotate about the central axis 50 without shaking and producing noise.

Third, after the abovementioned processes, the foodstuff is gradually cut, crushed, grinded and squeezed, in addition to the foodstuff undergoing a longer process of juice extraction for improving the extracting effectiveness, and because the whole grinding section 613 is adjacent to the second tubular wall 512 of the tubular main body 51 so as to disperse the squeezing pressure bore by the tubular main body 51, the foodstuff can be completely crushed, minced, and ground, so that the foodstuff and the residues will not be accumulated along a conveying path, and the residues can be smoothly discharged. Besides, the annular protrusions 553 at the two ends of the neck portion 55 are respectively covered by the annular flange 54 and the tubular main body 51, and the neck portion 55 is located at the center of the filter member 552, so that a seam between the neck portion 55 and the annular flange 54 and a seam between the neck portion 55 and the tubular main body 51 are not obvious, and the ground foodstuff and the residues will not be accumulated in the seams, thereby preventing the tubular main body 51 from being squeezed and damaged. Hence, the service life of the tubular member 5 can be prolonged.

Fourth, the elastic ring 56 is retained to the annular flange 54 by the front frame ring 57, so that the elastic ring is detachable. Therefore, when the elastic ring is dirty or deteriorated, there is no need to replace the whole tubular member 5, only the front frame ring 57 is detached from the tubular member 5 to remove the damaged elastic ring 56 and replace it with a new one. In this manner, waste of the tubular member 5 can be avoided and the method to replace the elastic ring 56 is easy.

Figure 7:
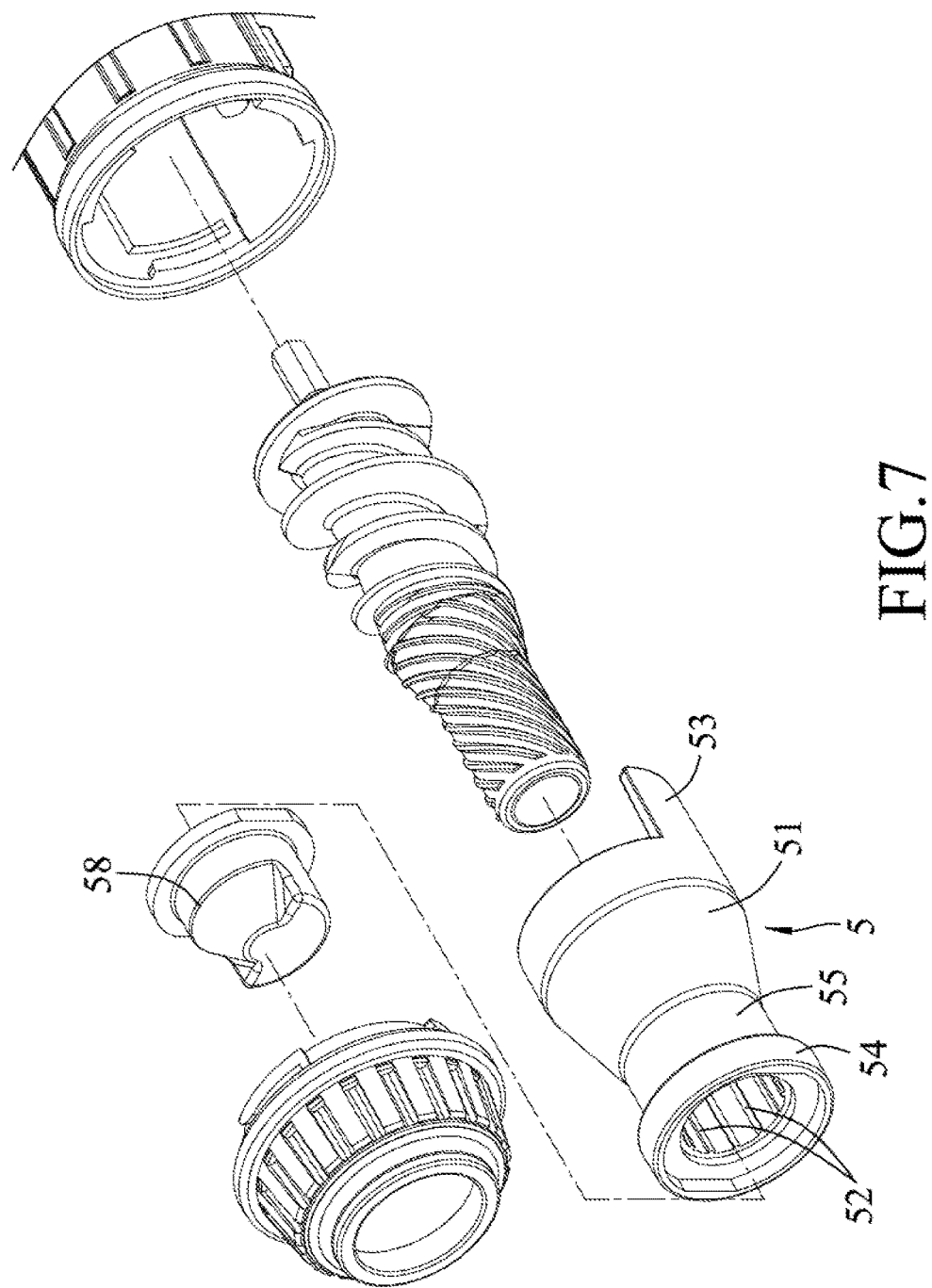
FIG. 7 is a fragmentary exploded perspective view of the second embodiment of a food processor according to the disclosure.
Figure 8:
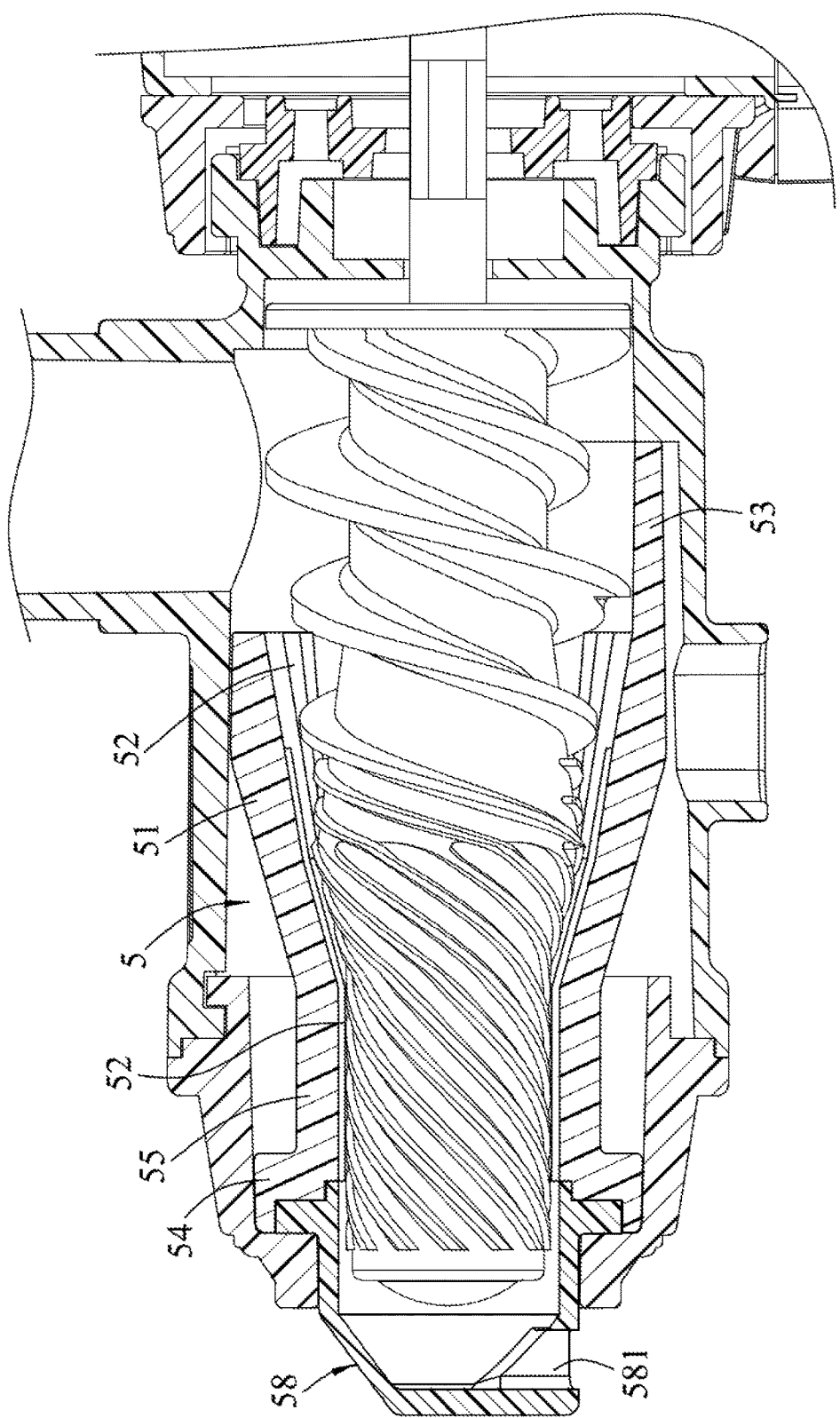
FIG. 8 is an enlarged fragmentary cross-sectional side view of the second embodiment.

Referring to FIGS. 7 and 8, a food processor according to the second embodiment of the present disclosure is configured as a grinder for grinding ice into crushed ice and grinding foodstuffs, such as cereals and nuts, into powder form. Therefore, the second embodiment has a structure similar to that of the first embodiment. The main difference between first and second embodiments resides in the structure of the tubular member 5. In this embodiment, the support plate 53 is a solid curved plate that has no leaking holes 531 (see FIG. 4) as disclosed in the first embodiment. The neck portion 55 is connected integrally as one piece with the tubular main body 51 and the annular flange 54, and is a hollow annular body without the filter holes 551 (see FIG. 4) as disclosed in the first embodiment. The ribs 52 extend along the central axis 50 from an inner wall surface of the tubular main body 51 to an inner wall surface of the neck portion 55. The tubular member 5 further includes a milling head 58 removably disposed at a front end of the annular flange 54 and having an exit hole 581 for output of processed crushed ice or cereals. The elastic ring 56 and the front frame ring 57 (see FIGS. 4 and 5) disclosed in the first embodiment are omitted herein.

Figure 9:
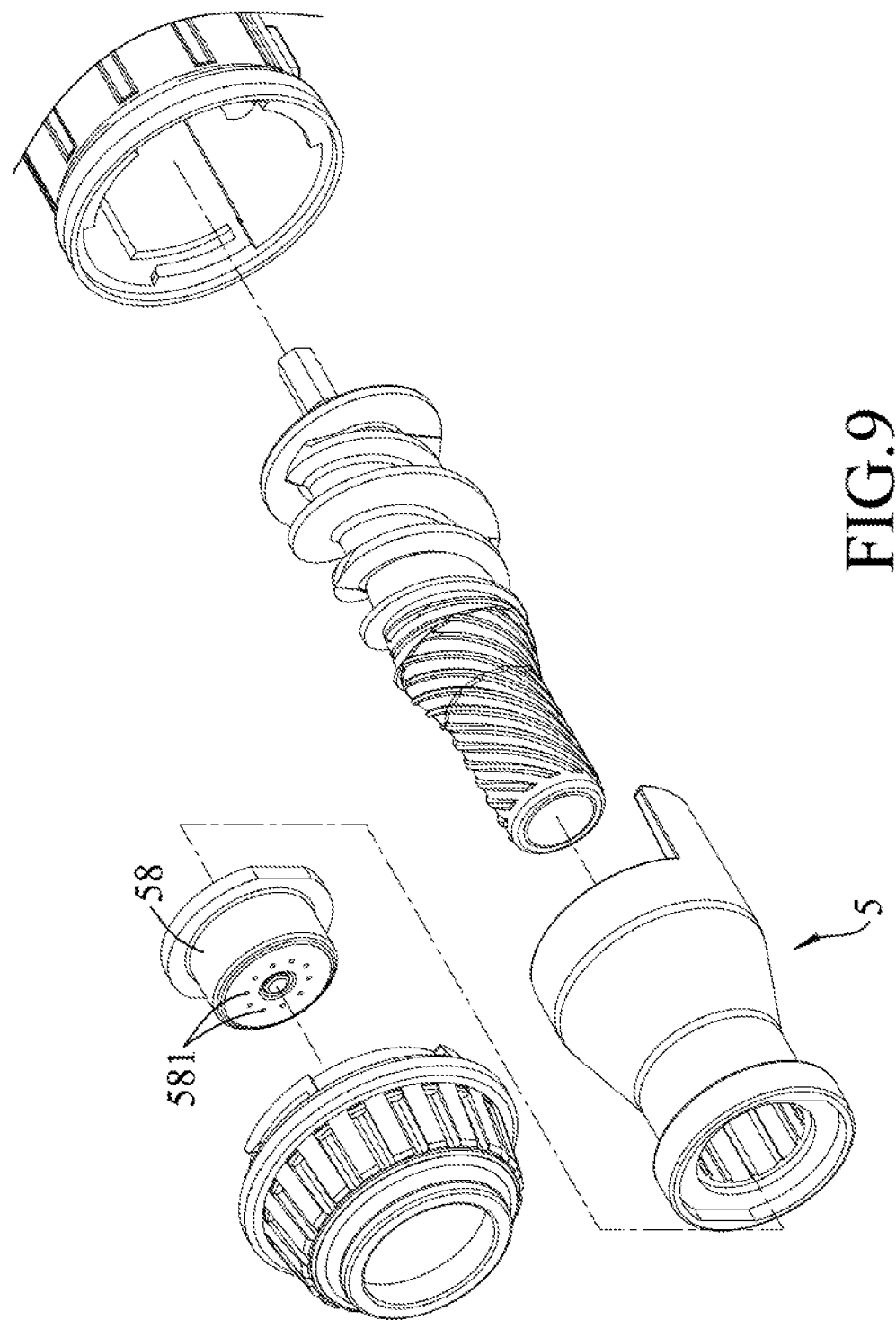
FIG. 9 is a fragmentary exploded perspective view of the third embodiment of a food processor according to the disclosure.

Referring to FIG. 9, a food processor according to the third embodiment of the present disclosure is configured as an extruding machine for mincing meat and making noodles. The third embodiment has a structure similar to that of the second embodiment. The main difference between the third and second embodiments resides in the structure of the milling head 58. In this embodiment, the milling head 58 has a plurality of spaced-apart exit holes 581 for output of the processed meat or noodles. The milling head 58 can be made to have different shapes and purposes to facilitate replacement and use. The shape of each exit holes 581 of the milling head 58 is not limited to this embodiment, and may be circular, elliptical, square, rectangular, flat, a star, a diamond, etc. The number of the exit holes 581 may be varied as well. For example, the milling head 58 may only have one exit hole 581.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A food processor comprising:
a tubular member surrounding an axis and including a tubular main body having a first tubular wall located on a rear side thereof and a second tubular wall extending forwardly from said first tubular wall, a neck portion connected to a front end of said second tubular wall, and an annular flange protruding outwardly and radially from a front end of said neck portion, said tubular main body further having a plurality of angularly spaced-apart protruding ribs extending from an inner wall surface of said first tubular wall to an inner wall surface of said second tubular wall, said second tubular wall having a frusto-conical shape and tapering from a rear side to a front side of said second tubular wall; and
a spindle inserted into said tubular member and rotatable about the axis, said spindle including a guide entry section disposed rearwardly of said first tubular wall, a crushing section extending forwardly from said guide entry section into said first tubular wall, a grinding section extending forwardly from said crushing section into said second tubular wall, an extension section extending forwardly from said grinding section into said neck portion, a guide exit section extending forwardly from said extension section into said annular flange, a guide thread helically wound around said guide entry section, a crushing thread connected to said guide thread and helically wound around said crushing section, and a plurality of spaced-apart grinding threads helically extending from said grinding section to said guide exit section, said guide thread having a first ring segment helically extending one revolution around said guide entry section, and a second ring segment connected to one end of said first ring segment and helically extending one revolution around said guide entry section, said first ring segment having a thread depth smaller than that of said second ring segment.

2. The food processor as claimed in claim 1, wherein a pitch of said grinding threads is equal to one to three times a thread depth thereof, and a screw lead of said grinding threads is equal to eight to fourteen times the pitch.

3. The food processor as claimed in claim 1, wherein said guide entry section has a uniform diameter, said crushing section having a diameter gradually expanding from said guide entry section toward a front side of said crushing section, said grinding section having a diameter tapering from said crushing section toward a front side of said grinding section, each of said extension section and said guide exit section having a uniform diameter.

4. The food processor as claimed in claim 3, wherein said crushing section and said first tubular wall are spaced apart to form a first gap which tapers in a rear to front direction, said grinding section and said second tubular wall being spaced apart to form a uniform second gap which is smaller than the first gap, said extension section and said neck portion being spaced apart to form a uniform third gap which is equal to the second gap.

5. The food processor as claimed in claim 1, wherein said tubular member further includes a support plate projecting rearwardly from a rear bottom edge of said tubular main body, said support plate being located below said guide entry section and being spaced apart from said guide thread, said support plate and said first ring segment being spaced apart to form a gap which is larger than that between said support plate and said second ring segment.

6. The food processor as claimed in claim 5, wherein said neck portion has a filter member that is cylindrical and that has a plurality of filter holes, and two annular protrusions projecting outwardly, radially and respectively from front and rear ends of said filter member and respectively embedded in said annular flange and said front end of said second tubular wall, said support plate having a plurality of leaking holes.

7. The food processor as claimed in claim 6, wherein said tubular member further includes an elastic ring disposed on a front end of said annular flange, and a front frame ring removably retaining said elastic ring on said front end of said annular flange, said elastic ring covering a gap between said front end of said annular flange and a front end of said guide exit section.

8. The food processor as claimed in claim 5, wherein said tubular member further includes a milling head removably disposed at a front end of said annular flange and having at least one exit hole for output of processed foodstuff.

9. The food processor as claimed in claim 1, further comprising a drive unit for driving rotation of said spindle, and a container unit covering said tubular member and detachably connected to a front end of said drive unit, said container unit including a hollow container body, a feed tube extending upwardly from a top portion of said hollow container body for guiding entrance of foodstuff to be processed into said hollow container body, and a front cover detachably connected to a front end of said hollow container body, said hollow container body and said front cover cooperatively defining a receiving space for receiving said tubular member, said hollow container body having a guide inlet opening that is formed in said top portion, that is located above said guide entry section and that communicates with said feed tube and said receiving space, and a juice discharge opening formed in a bottom portion of said hollow container body and communicating with said receiving space for discharging squeezed juice from the foodstuff, said front cover having a residue discharge opening communicating with said receiving space for discharging residues of the processed foodstuff.

* * * * *